Aug. 12, 1958  J. J. TIPTON  2,846,968
MECHANICAL PIPE LINE CLAMP
Filed Nov. 28, 1955  2 Sheets-Sheet 1
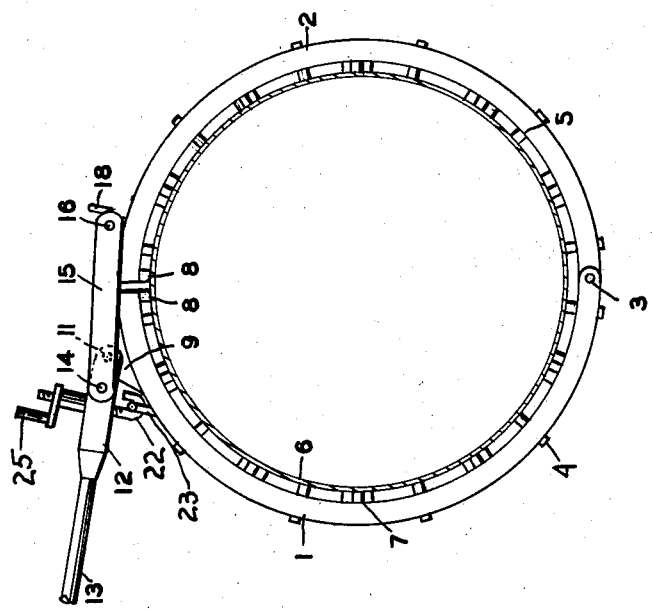
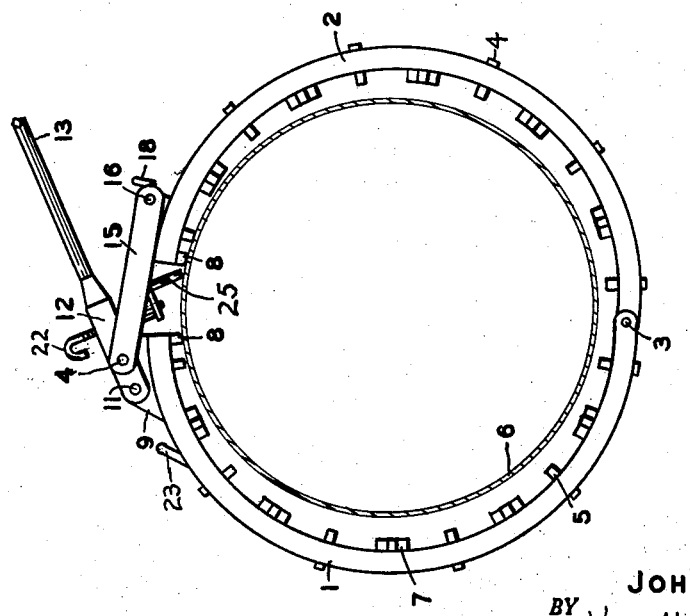
INVENTOR.
JOHN J. TIPTON
BY Kenneth M. Thorpe
atty.

Aug. 12, 1958 J. J. TIPTON 2,846,968
MECHANICAL PIPE LINE CLAMP
Filed Nov. 28, 1955 2 Sheets-Sheet 2
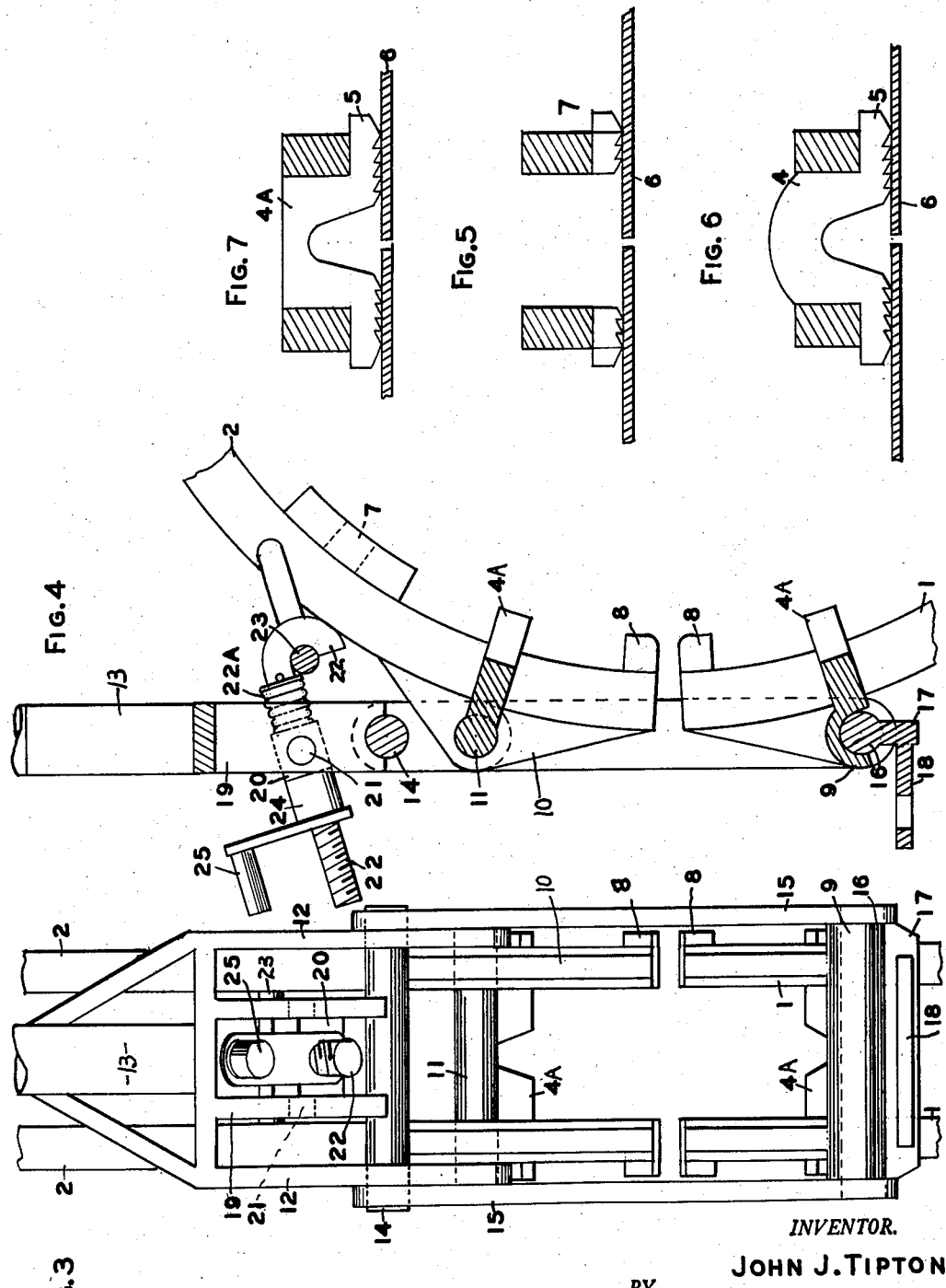
INVENTOR.
JOHN J. TIPTON
BY United States Patent Office 2,846,968
Patented Aug. 12, 1958

2,846,968

MECHANICAL PIPE LINE CLAMP

John J. Tipton, Paola, Kans.

Application November 28, 1955, Serial No. 549,381

2 Claims. (Cl. 113—102)

This invention relates to pipe aligning clamps for use in aligning and retaining pipe as they are being welded. At the present time pipe up to approximately 30" in diameter are being used in pipe line systems and this diameter of pipe is difficult to bring back to round and retain during the welding operation. These difficulties have increased as it is now necessary to lay-up the weld bead as a continuous operation, as distinguished from the older system of tacking at a few points and completing the weld after the pipe has cooled. Applying the bead as a continuous operation puts more heat into the pipe with a result that expansion and overlapping difficulties are encountered.

One of the objects of the present invention is to supply a pipe clamp of strong and rigid construction which will hold its shape and resist warping and misuse, and will bring pipe back to round and hold same during a welding operation.

Another object of the invention is to provide a construction having means to resist expansion of the pipe toward the weld joint during the welding operation, since the pipe are initially spaced a predetermined distance and a change in spacing leads to irregularities in the welding operation.

A further object of the invention is to provide clamping mechanism of such nature that the clamp can be locked at any desired point when the pipe is aligned to the desired point, and the parts will be held in such position against the spring-back tendency due to the stresses set up in the pipe.

With the general objects named in view and others as will hereinafter appear, the invention consists in certain new and useful features of construction and organization of parts as hereinafter described and claimed; and in order that it may be fully understood, reference is to be had to the accompanying drawings, in which:

Figure 1 is a cross section through a pipe and illustrates the clamp of the invention in open position.

Figure 2 is a view of the construction shown in Figure 1 after the clamp has been closed and is being held closed by an adjustable safety latch.

Figure 3 is an enlarged elevation of the clamping mechanism in fully closed position.

Figure 4 is a longitudinal section through Figure 3.

Figure 5 is a section through the abutting ends of a pair of pipe as clamped by the clamping lugs.

Figure 6 is a section similar to Figure 5 but illustrates arch member contacting the pipe and uniting the parallel straps of each section so that the welder can lay up a continuous bead under the arches.

Figure 7 is a view, similar to Figure 6, of a modified arch that reinforces the operating shafts of the device.

In the said drawings, where like reference characters identify corresponding parts in all of the figures, the clamp ring comprises two semi-circular sections 1 and 2, each section being made up of a pair of identical curved straps, and said sections are pivoted together at one end on a pin 3. The identical curved straps of each section are held rigidly together by arches 4, as shown in Figure 6, said arches being welded to the underfaces of the straps and to their inner vertical faces, and having extension ends 5 for flatwise abutment with the pipe 6 to be welded. Equally spaced between the arches 4 are pipe clamping lugs 7, preferably of T-shape, the head of the T underlying the straps and the stem of the T terminating flush with the extension ends 5 of the arches 4. The clamp sections 1 and 2 are designed for diameters within a predetermined range and their open ends have guide lugs 8, said lugs and arches being so spaced around the inner periphery of the clamp that in the clamping operation any tendency of the pipe to bulge outwardly is overcome.

In the drawings, the free ends of the straps forming the clamp ring section 1 are formed with an outwardly facing detent or hook 9 which is reinforced and braced by an underlying flat arch 4A which tends to distribute the pressure and avoid canting or twisting of the arch due to exerting more pressure on the end of one pipe than on the other. The free ends of section 2 are formed with lugs 10 welded to the outer edges of the straps and said lugs are provided with alined openings receiving a non-rotatable pin or shaft 11 which is also welded to the top of a flat arch 4A so that in the clamping operation the pressure is spread over lugs 8, 4A and 7 to prevent crushing of a pipe end. The pin 11 projects beyond lugs 10 and is journaled in openings in the bifurcated ends 12 of an operating lever 13.

At a point spaced from the pin 11, the bifurcated ends 12 of the lever 13 are provided with through openings in which a pin 14 may be rigidly secured, the ends of said pin 14 being respectively journaled in the ends of a pair of identical links 15. Spanning the free ends of the links 15 and rigidly secured thereto is a locking pin 16 which is adapted for cooperative engagement with the hook 9 on the ends of the straps forming clamp frame 1. When the lever 13 is thrown to unlocking position, the locking pin 16 is moved out of the hook 9 and the links 15 and locking pin 16 may be opened by throwing them up around the shaft 14 as a center. For convenience the ends of the links 15 and pin 16 carry a plate 17 which is equipped with a handle 18.

In order to provide a safety device to lock the clamp in any predetermined position against the force of spring-back of a pipe, an off-center safety latch is pivoted to the operating clamp arm in such a fashion that it is always in position to lock the parts during the clamping operation and will hold them fixed during the welding of the pipe. This construction is shown in Figure 4 where the bifurcated ends 12 of the lever 13 are connected by a pair of spaced straps 19 to the pin 14, said straps being welded in position. Rockingly mounted between the straps 19 on its pintles 21 is a block 20. Block 20 is formed with a through opening at right angles to its pintles 21 and slidingly received in said opening is a hook 22 having its straight end threaded. The hook 22 is spring-advanced by a spring 22A and is balanced on its pintles to throw hook 22 in position for engaging a catch 23 carried by the frame member 2.

The threaded end of the hook 22 is received within a threaded sleeve 24 provided with an operating crank handle 25 so that the hook 22 may be drawn-up against the link 23 and hold the clamp locked against opening movement, against the resiliency of the pipe being rounded and clamped as a preliminary to a welding operation.

By reference to Figures 5, 6 and 7, it will be noted that if desired, the faces of the lugs and arches may be formed with corrugations or teeth to assist in holding the pipe against expansion toward the weld line due to the heat of the torches or electrodes. Usually the welding of large size pipe is conducted by two operators working simultaneously on opposite sides of the pipe since this assists in balancing out the distortion which would occur if the pipe were heated at one side only.

From the above description and drawings it will be apparent that I have produced a construction embodying all of the features of advantage set forth as desirable, and while I have described and illustrated the preferred construction, it is to be understood that I reserve the right to all changes within the spirit and scope of the appended claims.

I claim:

1. In a pipe aligning clamp, a pair of semi-circular clamp members pivoted together at one end, each member comprising a pair of spaced identical elements, a hook projecting radially outward from the free end of the first clamp member, a lever pivoted to the free end of the second clamp member, a link pivoted to the lever at a point outward of the pivotal point of the lever to the clamp member, a block rockingly carried by the lever, a latch non-rotatably mounted in and longitudinally adjustable of the block, the longitudinal axis of the latch lying in a plane bisecting the space between the identical elements of the clamp members, said latch being threaded at one end, a crank threaded on the end of the latch to reciprocate the latch in the block, and a catch on the free end of the first clamp member for engagement with the latch.

2. In a pipe aligning clamp, a pair of semicircular clamp members pivoted together at one end, each member comprising a pair of spaced identical elements, a hook projecting radially outward from the free end of the first clamp member, a lever pivoted to the free end of the second clamp member, a link pivoted to the lever at a point outward of the pivotal point of the lever to the clamp member, a block rockingly carried by the lever, a latch non-rotatably mounted in and longitudinally adjustable of the block, the longitudinal axis of the latch lying in a plane bisecting the space between the identical elements of the clamp members, said latch being threaded at one end, a crank threaded on the end of the latch and in abutment with the lever to reciprocate the latch in the block, a spring for maintaining the crank in abutment with the lever, and a catch on the free end of the first clamp member for engagement with the latch.

References Cited in the file of this patent

UNITED STATES PATENTS

| | | |
|---|---|---|
| 493,118 | Robinson | Mar. 7, 1893 |
| 1,969,572 | Maurer | Aug. 7, 1934 |
| 2,308,340 | Newlon | Jan. 12, 1943 |
| 2,405,288 | Butt | Aug. 6, 1946 |
| 2,557,202 | Raymond et al. | June 19, 1951 |
| 2,674,966 | Morris | Apr. 13, 1954 |

FOREIGN PATENTS

| | | |
|---|---|---|
| 276,097 | Germany | Oct. 16, 1913 |